(12) United States Patent
Widt

(10) Patent No.: US 6,945,092 B2
(45) Date of Patent: Sep. 20, 2005

(54) METHOD FOR OPERATING A FILM LEAK INDICATOR AND A CORRESPONDING FILM LEAK INDICATOR FOR CARRYING OUT SAID METHOD

(75) Inventor: Rudi Widt, Cologne (DE)

(73) Assignee: Inficon GmbH (DE)

(*) Notice: Subject to any disclaimer, the term of this patent is extended or adjusted under 35 U.S.C. 154(b) by 0 days.

(21) Appl. No.: 10/175,694

(22) Filed: Jun. 20, 2002

(65) Prior Publication Data

US 2003/0233866 A1 Dec. 25, 2003

Related U.S. Application Data

(63) Continuation of application No. PCT/EP00/11152, filed on Nov. 10, 2000, now abandoned.

(51) Int. Cl.[7] .............................................. G01M 3/04
(52) U.S. Cl. ......................................................... 73/40.7
(58) Field of Search ........................ 73/40, 40.7, 49.2, 73/49.3, 52

(56) References Cited

U.S. PATENT DOCUMENTS

| | | | | |
|---|---|---|---|---|
| 3,027,753 A | * | 4/1962 | Harder, Jr. .................... 73/40.7 |
| 3,690,151 A | * | 9/1972 | Briggs .......................... 73/40.7 |
| 4,492,110 A | * | 1/1985 | Bergquist ..................... 73/40.7 |
| 4,998,435 A | | 3/1991 | Miller et al. |
| 5,168,747 A | * | 12/1992 | Weaver et al. ................ 73/40.7 |
| 5,325,708 A | * | 7/1994 | De Simon .................... 73/40.7 |
| 5,369,983 A | * | 12/1994 | Grenfell ....................... 73/40.7 |
| 5,786,529 A | * | 7/1998 | Voss et al. .................... 73/40.7 |
| 5,889,199 A | | 3/1999 | Wong et al. |
| 5,939,619 A | | 8/1999 | Achter et al. |
| 6,354,142 B1 | * | 3/2002 | Nothhelfer et al. .......... 73/49.3 |

FOREIGN PATENT DOCUMENTS

| | | | |
|---|---|---|---|
| DE | 19846799 A1 * | 4/2000 | ............ G01M/3/20 |
| DE | 19962006 A1 * | 6/2001 | ............ G01M/3/32 |
| EP | 0377264 | 7/1990 | |
| EP | 0432305 A1 | 6/1991 | |
| EP | 0826954 A3 | 3/1998 | |
| EP | 0826954 A2 | 3/1998 | |
| WO | WO99/46572 | 9/1999 | |
| WO | WO 00/22399 * | 4/2000 | ............ G01M/3/20 |

* cited by examiner

Primary Examiner—Charles Garber
(74) Attorney, Agent, or Firm—Wall Marjama & Bilinski LLP

(57) ABSTRACT

The invention relates to a method for operating a film leak indicator (1) comprising two films (5, 6), which are each tensioned inside a frame (3, 4) and which delimit a testing space (80) when a test piece (79) is introduced. In addition, said film leak indicator is equipped with two vacuum pumps (13, 20). According to the invention, the testing space (80) is firstly evacuated and the film leak indicator is switched over to a leak search mode after the evacuation is completed. In order to prevent the search for leaks from being impaired by fluctuating helium concentrations in the ambient air, the invention provides that, before starting the leak search process, the helium concentration of the ambient air is measured and this measurement is taken into account during subsequent leakage measurements.

5 Claims, 2 Drawing Sheets

METHOD FOR OPERATING A FILM LEAK INDICATOR AND A CORRESPONDING FILM LEAK INDICATOR FOR CARRYING OUT SAID METHOD

CROSS REFERENCE TO RELATED APPLICATION

This is a continuation of International Application PCT/EP00/11152, filed 10 Nov. 2000, which designated the United States, and is now abandoned.

BACKGROUND OF THE INVENTION

The present invention relates to a method for operating a film leak indicator comprising two films, which are each tensioned inside a frame and which delimit a testing space when a test piece is introduced. In addition, said film leak indicator is equipped with two vacuum pumps. According to the present invention, the testing space is firstly evacuated and the film leak indicator is switched over to a leak search mode after the evacuation is completed and where furthermore during the first evacuation phase of the testing space, only one of the two vacuum pumps and where in the leak search mode only the second vacuum pump is utilized (in accordance with patent application 198 46 799.0). Moreover, the present invention relates to a film leak indicator suited for implementing said method.

In the instance of integral leak detection in accordance with the principal patent application, the test piece is already filled with the test gas, helium in this case, before the measurement. The helium escaping through a present leak is detected in the testing chamber. The natural ambient air already contains a small amount of helium, which, however, is mostly negligible. Owing to filling processes the share of helium may increase in certain cases. Then the detection system of the leak indicator can now no longer discern unambiguously whether the measured helium originates from the test piece or the ambient air trapped in the testing chamber. The measured results become more uncertain; the detection limit of the leak indicator is degraded.

It is the task of the present invention to operate and implement a film leak indicator in accordance with the principal patent application in such a manner that increased helium concentrations in the ambient air will not give rise to incorrect measurements.

This task is solved through the measures contained in the patent claims.

Further advantages and details of the present invention shall be explained with reference to the design examples depicted in the drawing figures.

DETAILED DESCRIPTION

Figure 1:
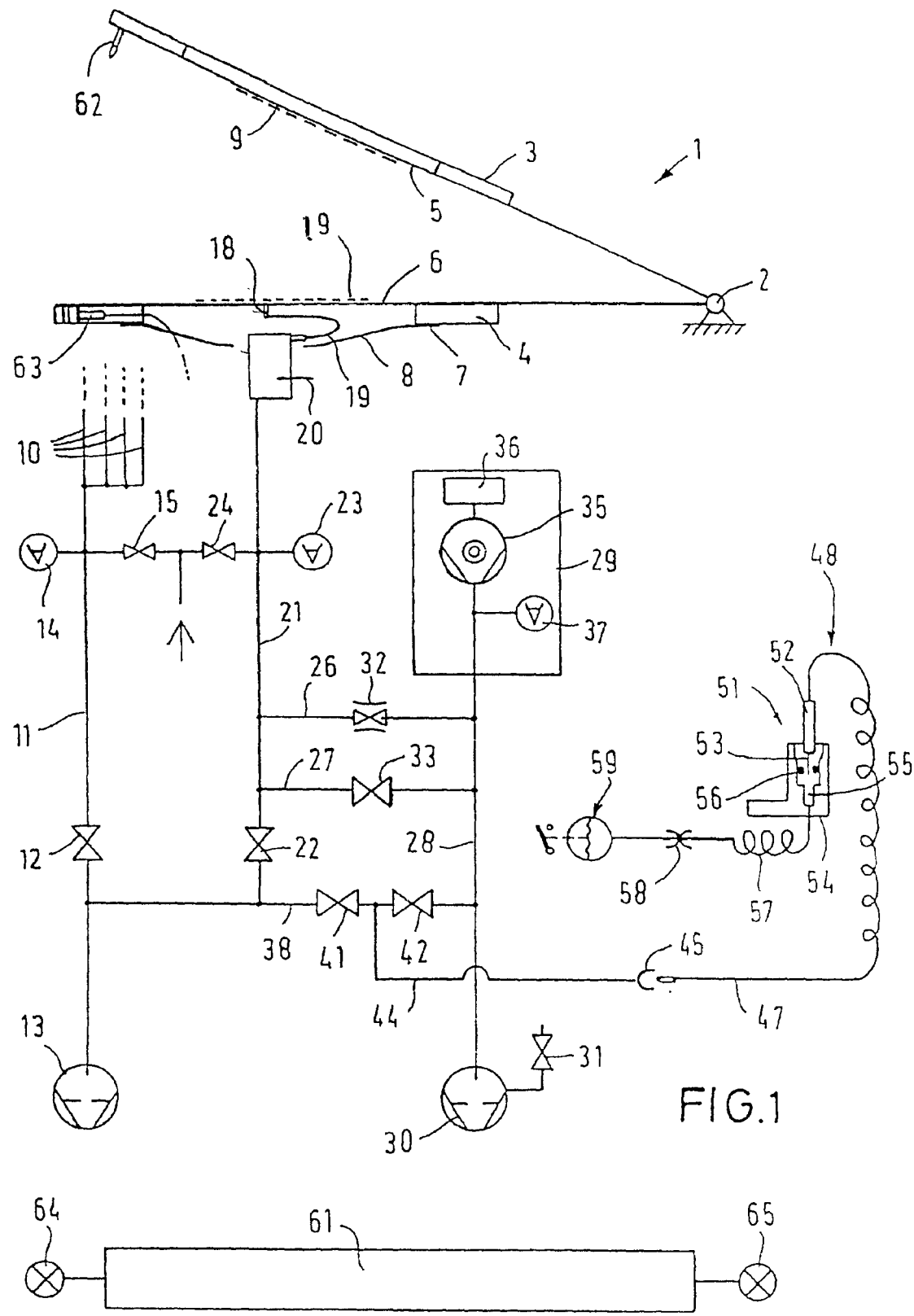
FIG. 1 is a schematic of a film leak indicator in accordance with the present Invention, including its circuit diagram.

Drawing FIG. 1 schematically depicts the film leak indicator 1 with its frames 3 and 4 joined via articulation 2, as well as the foils 5 and 6 tensioned in said frames. The frames 3 and 4 are circular in shape. The bottom frame is supported by the rim 7 of the plate-shaped bottom 8—preferably made of steel. Fleece sections 9 located on the films 5, 6 ensure the formation of a coherent testing space when the test piece has been introduced. The principal design of a film leak indicator of this kind is, moreover, known from DE-A-196 42 099.

The bottom frame 4 is equipped with several bore holes not depicted in detail which open out to the inside of the testing space which is formed by the two films 5, 6 when a testing piece is introduced. Connected to these bore holes are line sections 10 which are linked via the common line 11 to the valve 12 with the fore vacuum pump 13. With reference to the valve 12 upstream, also pressure gauge 14 and venting valve 15 are connected to the line 11.

The bottom film 6 is equipped approximately at its center with a line connection 18, to which the line section 19, the filter 20 and the line 21 with valve 22 are adjoined. Also, the line 21 is equipped with a pressure gauge 23 and with a venting valve 24.

The section of the line 21 which is located between the connection for the pressure gauge 23 and the valve 22, is connected via two lines 26 and 27 parallel with respect to each other with a line 28 extending between the test gas detector 29 and a second fore-vacuum pump 30. Located in the line 26 is a throttle valve 32. The line 27 is equipped with a valve 33.

The fore-vacuum pump 13 is preferably of a single-stage design, the fore-vacuum pump 30 of a two-stage design. The pump 30 is equipped with a gas ballast device. With valve 31 open, air (or also inert gas) flows into the pump 30.

Located in the test gas detector 29 is a turbomolecular vacuum pump 35, the outlet of which is connected to line 28. Connected to the inlet of the turbomolecular vacuum pump is a mass spectrometer 36. Moreover, a pressure gauge 37 is a component of the leak indicator 29, said gauge measuring the pressure in line 28.

The two lines 11 and 28 are linked down stream with respect to the valves 12 and 22 via a line 38 into which also the line 21 opens out. In this line 38 there are located between the opening of the line 21 and the line 28, the valves 41 and 42. A line 44, which is linked to a coupling 45, opens out into the section of the line 38 located between valves 41 and 42. The coupling 45 serves the purpose of providing the connection of the line 44 to the sniffer line 47 of a sniffer 48. The sniffer probe designated as 51 of the sniffer 48 comprises handle 52 and sniffer tip 53.

A holster 54 is provided for depositing the sniffer probe. Said holster is either affixed at the film leak indicator 1 or designed by way of a separate stand. It has a hollow space 55 which accepts the sniffer tip when depositing the probe 51. Moreover, a seal 56 is provided which seals off the hollow space 55 against the handle 52 when the probe 51 is deposited. Connected to the hollow space 55 is a line 57, which is linked via a coupling 58 to a low-pressure switch 59, accommodated in the casing of the film leak indicator 1. A capillary (about 0.5 mm in diameter) serves as the sniffer line 47 in a basically known manner. This also applies to the line 57 so that the low pressure generated by the sniffer tip 53 in the space 55 will quickly affect the low-pressure switch 59.

In the film leak indicator in accordance with drawing FIG. 1, the leak searching cycle is performed automatically. The control center, depicted only as block 61, is provided to control the process. Linked to it are all measuring instruments and all components which are to be controlled. This also applied to a switch, which is actuated upon closing the testing space. In the presented example of an embodiment, said switch is a proximity switch comprising a metal pin 62 provided in frame 3 and a sensor 63 arranged at frame 4. The sensor 62 is linked to the control center 61. Also, other switches, be they electrically, mechanically or optically operated, can be employed to this end.

The multitude of electrical connecting lines between the control center 61 and the components is not depicted for clarity. Linked to the control center are also two signaling lights 64, 65 of which one lights up in green when the test object is sensed as being leak-tight and where the other lights up in red when the test object is sensed as being leaky.

In the instance of an operationally ready film leak indicator 1 in accordance with the principal patent application, all valves—except valve 41—are closed when the testing space—as depicted in drawing FIG. 1—is open or when the top frame 3 has been lifted off the bottom frame 4. After placement of a test piece on the bottom film 6, and after having placed the top frame 3 on the bottom frame 4, the proximity switch 62, 63 initiates the leak searching process. To this end, a check is performed first whether there is present in the system an increased helium background that might falsify the leakage measurements. This is conducted with the aid of the mass spectrometer 36. If it indicates too high a background, the valve 31 is opened and the pump 30 is operated with its gas ballast active for such a period of time, until the helium background has attained a non-detrimental value.

Generally an increased helium background will not be present so that upon closing the testing space also the actual leakage searching cycle commences. Initially the valves 12 and 22 are open. This results in an extremely rapid evacuation of the space between the films 5, 6. Outside of the area in which the fleece sections 9 are present, the films 5,6 indirect contact with each other form the seal for the testing space.

In the instance of the leak searching method in accordance with the principal patent application, throttle valve 32 is opened at a pressure of a few 100 mbar (100 to 300 mbar). It is so rated that the necessary fore-vacuum pressure of the turbomolecular pump 35 does not attain inadmissibly high values. Gross leak detection commences upon opening the throttle valve 32. If helium flows through the throttle valve 32 it will, in a counter-flow through the turbomolecular pump 35, flow to the mass spectrometer 36. If helium is recorded, the test piece has a leak; the leak searching cycle is then cancelled.

In case helium is not yet recorded, the evacuation process is continued. If the pressure measured with instrument 23 attains a value, which lies in the order of magnitude of the fore-vacuum pressure of the turbomolecular pump 35, then the valves 12, 22 and 32 are closed and the valve 33 is opened. Now the phase of leak searching at the highest sensitivity commences. This phase is cancelled when either test gas is recorded, i.e. when the test piece has a leak, or it is cancelled after a defined period of time. Either a fixed time span is defined, or testing continues until the pressure (measured with instrument 23) drops below a certain value. If no test gas is recorded within this time, such a result will lead to the conclusion as to a leak-tight test piece.

During the high sensitivity leak-searching phase, only the lines 19, 21 and 27 provide the connection between the testing space and the leak indicator 29. Bursting of the test piece is no longer to be expected. Moreover, there is located between the lines 19 and 21 the particle filter 20 which keeps any contaminants away from the leak indicator 29.

The leak detection cycle in accordance with the principal patent application is terminated such that all previously open valves—except for valve 41—are closed, and valves 15, 24 are opened. The testing space is vented; the top frame 3 can be lifted off from the bottom frame 4. It is expedient when the two frames 3, 4 which are joined in an articulated manner are exposed to the effect of a not depicted spring device in the area of the articulation 2, where the force of said spring device acts in the opening direction. Its force should be so rated that the vacuum generated during leak searching keeps the testing space closed, and that the frame 3 reverts to its open position after the venting process.

If during the leak test it is determined that a test piece is leaky, and then the user will be interested in acquiring the location of the leak. To this end, the film leak indicator in accordance with the present invention is equipped with a sniffer 48. It is connected with its sniffer line 47 via coupling 45 to the line 44.

As long as the sniffer 48 is not utilized, it remains deposited in a holster 54. This holster 54 is equipped with the means 55 to 59 already detailed, with which the control center 61 can determine whether or not the probe 51 has been deposited in the holster 54. Also other means—be they mechanically electrically or inductively operated switches—may be employed to this end.

As long as the probe 51 is placed in holster 54, the valve 41 is maintained—as already mentioned—in the open state. Thus the sniffer is kept continuously in standby. Only after it has been removed from its holster 54, will the valve 41 close and the valve 42 open. The gas flow passing through the sniffer 48 passes thus into the line 28 and the gas flow is maintained by pump 30. In this state, sniffer leak detection will be possible. The helium taken up by the sniffer tip 53 passes in a counter-flow through the turbomolecular pump 35 into the mass spectrometer 36.

The control center 61 is programmed in such a manner that no switchover of the sniffer 48 from standby to the leak-searching mode (switchover of valves 41 and 42) can occur as long as the proximity switch 62, 63 is closed. The possibility of simultaneous leak searching via the film leak indicator 1 and via the sniffer 48 resulting in incorrect measurements is thus excluded.

In the instance of a quantitative leak search, the searcher will generally be interested in the leak rate in mbar 1/s of the leak found.

In the analysis of test pieces manufactured in large numbers there is, however, also an interest in measuring the concentration of the test gas in the test piece. This may be implemented in that the sniffer probe 53 is made to prick into the test piece or in that the test piece is equipped with a defined leakage, and a leak searching cycle is performed in the film leak indicator 1. The control center is, for this reason, so arranged that on a display not depicted, both the leak rate and also the concentration can be read off.

Figure 2:
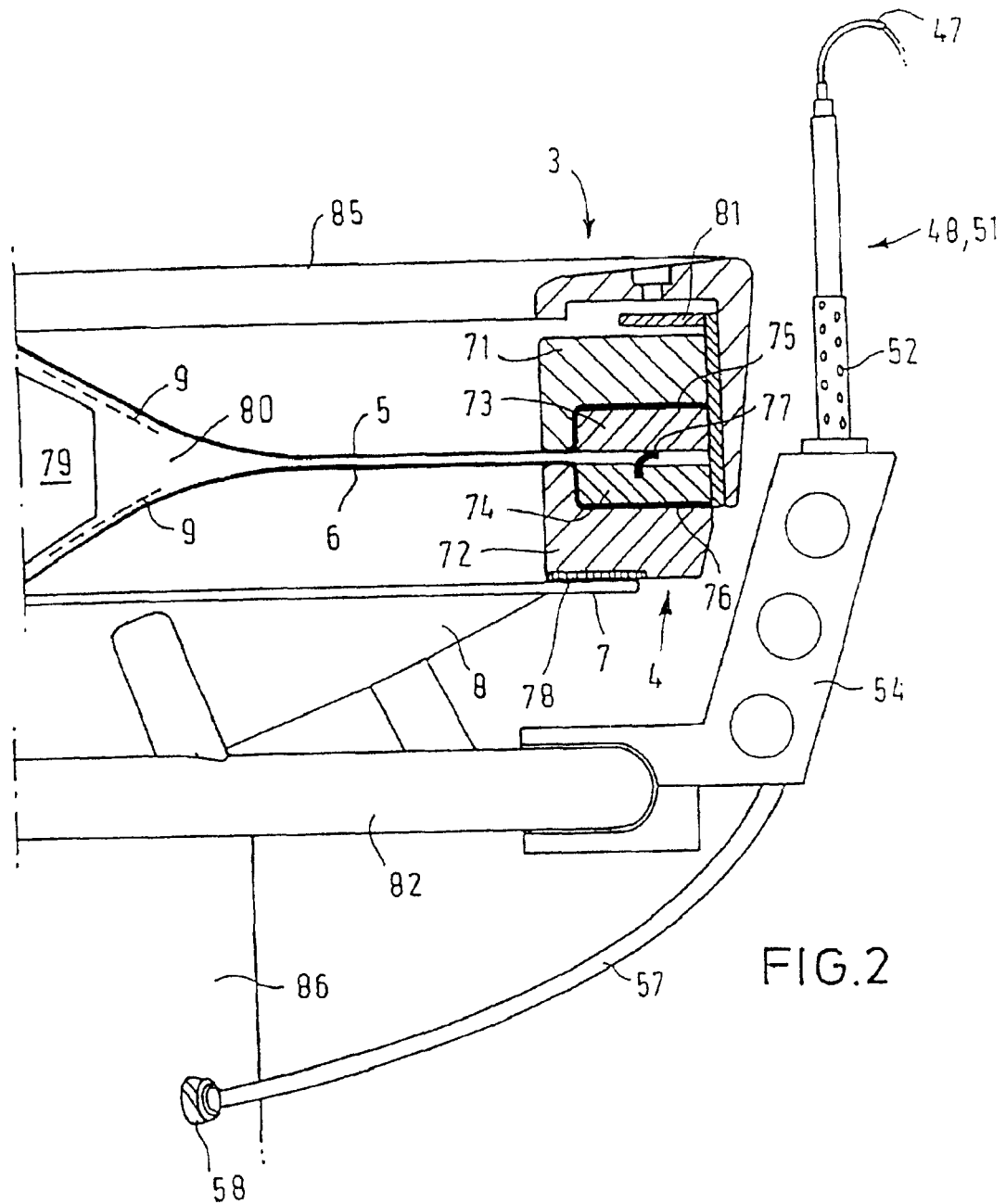
FIG. 2 is a partial section through the frames in which the films are tensioned And further details are depicted.

From drawing FIG. 2, the design of the frames 3 and 4 is apparent. They each consist of an outer ring 71 and 72 respectively, and an inner ring 73, 74. The films 5, 6 are affixed, preferably cemented, between the pair of rings. The inner rings in each instance are located within corresponding recesses 75, 76. The recesses are arranged in such a manner that the outer rings 71, 72 face each other in their areas facing the testing space thereby defining the planes of the affixed films 5, 6. In the outer area, the inner rings 73, 74 face each other directly. Located between these is a lop seal 77. The films 5, 6 extend through the angle-shaped slot between the respective pairs of rings and are either tensioned or cemented.

From drawing FIG. 2 it is furthermore apparent that the films 5, 6 form a testing space 80 in the presence of a test piece 79. The fleece sections 9 ensure the formation of a coherent testing space 80.

The ring 72 of the bottom frame 4 is supported by the rim 7 of the plate-shaped bottom 8 and is cemented to it (adhesive layer 78). Assigned to the upper frame 3 is a carrier, which is formed by a steel profile 81 encompassing the frame 3 from the outside and partly from the top. Frame 3 is affixed in the axial direction in a floating manner to steel profile 81 so that after lowering, said frame rests uniformly against the entire circumference of the frame 4. A pressing force is produced in addition by evacuating the testing space 80. In the axial direction, the steel profile 81 extends over the frame 3 and down, and provides during the last phase of the lowering motion, a guide. The detector ring 85 serves the purpose of covering the steel ring 81.

Also depicted in drawing FIG. 2 is, that the depicted film leak indicator is equipped with a handle 82 running along circumference. Affixed to this is the holster 54 for the sniffer 48. Located in the holster 54 are the means already detailed with reference to drawing FIG. 1, which are utilized for determining whether or not the probe 51 of the sniffer 48 has been deposited in holster 54. Between the holster 54 and the housing 86 there extends the capillary hose 57, which is inserted into coupling 58.

In the instance of the leak searching method in accordance with the principal patent application, measures are proposed allowing the avoidance of faulty measurements owing to internal contamination. However, faulty measurements can also occur if the ambient air around the leak indicator has an unknown and too high a helium concentration. Therefore it is also of interest to know at least the magnitude of this helium concentration in order, for example, to recognize a restricted detection limit or compensate it in a suitable manner.

This is implemented through the object of the supplementary patent application in that the helium concentration of the air is measured before closing the testing chamber 80. In order to permit this measurement at that time, the throttle valve 32, which in the instance of the leak detection method in accordance with the principal patent application is open during gross leak searching, is modified so that it can also be open when the pressure in the line 21 is at atmospheric pressure. With chamber 80 open and with an open valve 32, a small flow of air passes to the inlet of the detector 29. The mass spectrometer 36 records the helium concentration in the entering air. The continuously measured values are stored for a short time (a few seconds will suffice) in a control device, for example.

Through these means the helium concentration in the air can be taken into account during subsequent leak searching processes. If such a process is initiated by placing the frame 3 on the frame 4, a value for the helium concentration in the air measured and saved just before closing the testing chamber can be taken into account in the evaluation of the leak measurement. If the test piece has a leak, then the leak search may be corrected automatically, for example. In the event of much too high helium concentrations in the air, a visual or acoustic warning may be initiated in addition.

It is important that the throttle valve 32 be so designed (sufficiently small throttling aperture) that the fore-vacuum pressure of the turbomolecular pump 35 will also not attain inadmissibly high values when the line 21 is at atmospheric pressure. At least before the leak searching process commences, the throttle valve 32 must be open while the leak-searching chamber 80 is still open.

What is claimed is:

1. A method for operating a film leak indicator comprising two films, which are each tensioned inside a frame and which delimit a testing space when a test piece is introduced where said film leak indicator is equipped with two vacuum pumps, the method comprising:

evacuating the testing space;

switching the film leak indicator to a leak search mode after the evacuation is completed, during the first evacuation phase of the testing space utilizing only one of the two vacuum pumps, wherein only the second vacuum pump is utilized in the leak search mode;

measuring the helium concentration of the ambient air; and checking the ambient air measurement before a leak search commences, wherein the ambient air measurement is taken into account during subsequent leakage measurements to avoid false measurements and in which the testing space of the film leak indicator can be evacuated both via bore holes located in one of the rims and also via a connecting port affixed to one of the films wherein the testing space during the first phase of the evacuation process is only evacuated via the bore holes with the aid of the first vacuum pump and where during leak searching only the connection port is utilized which is connected to the second vacuum pump.

2. The method according to claim 1, wherein a throttle valve which during the subsequent leak searching serves the purpose of searching for gross leaks, is maintained in the open state before leak searching commences, where the helium concentration of the ambient air flowing through the throttle valve is continuously recorded and stored and where during the subsequent leak measurement a measured and saved value for the helium concentration in the ambient air is taken into account before closing the leak indicator.

3. The method according to claim 2, wherein a test piece which during an integral leak test in the testing space was found to be leaky, is thereafter examined with the aid of a sniffer for the purpose of localizing the leak and where for integral leak searching, for sniffer leak searching and for determining the helium concentration in the ambient air, the same detector is employed.

4. A film leak indicator suited for the implementation of the method according to claim 3, wherein it is equipped with a control center.

5. The leak indicator according to claim 4, wherein a throttle valve is so rated that the fore-vacuum pressure of the turbomolecular pump will also not attain inadmissibly high values, even when atmospheric pressure is applied.

* * * * *